Jan. 12, 1932.  M. HANDSCHIEGL  1,840,670
TRICK METHOD OF PRODUCING COMPOSITE NEGATIVES
Filed Oct. 11, 1926    2 Sheets-Sheet 1
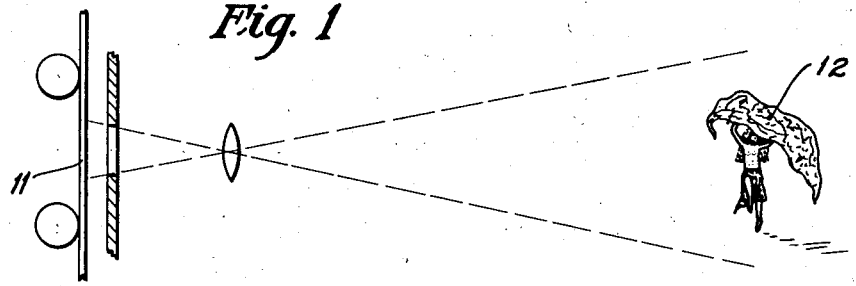
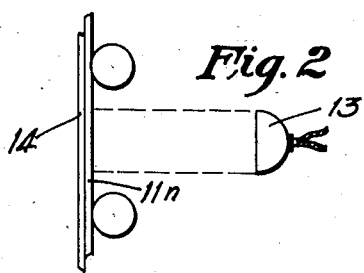
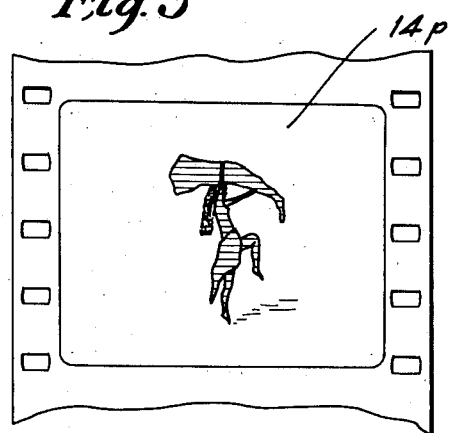
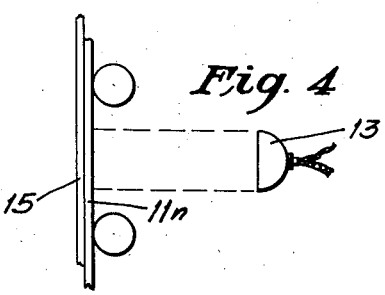
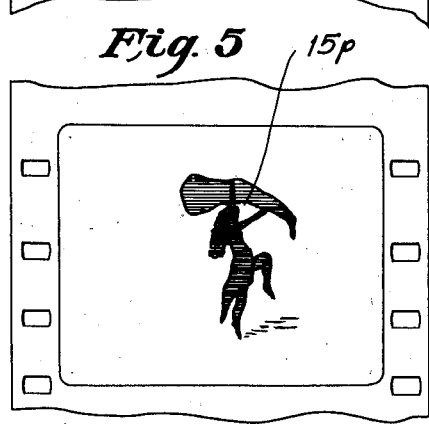
INVENTOR
MAX HANDSCHIEGL
ATTORNEY Jan. 12, 1932.    M. HANDSCHIEGL    1,840,670
TRICK METHOD OF PRODUCING COMPOSITE NEGATIVES
Filed Oct. 11, 1926    2 Sheets-Sheet 2
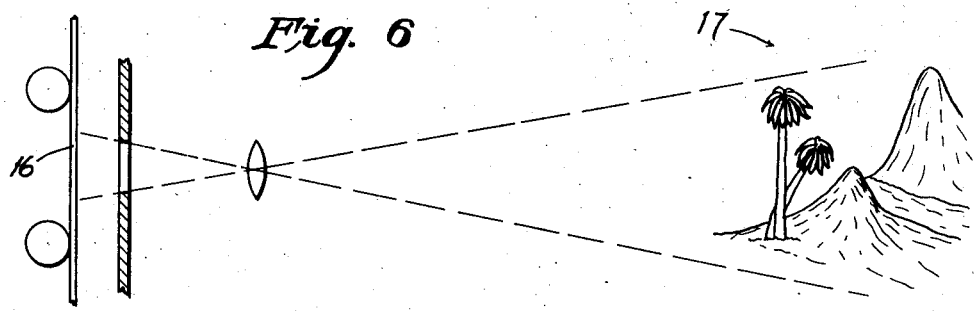
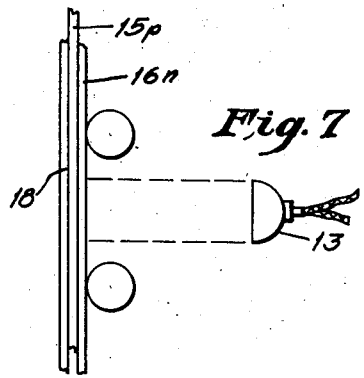
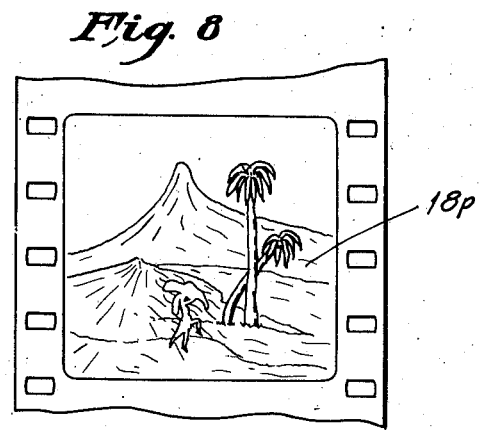
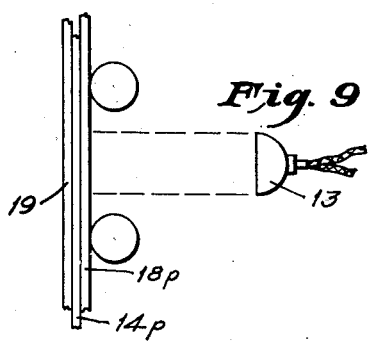
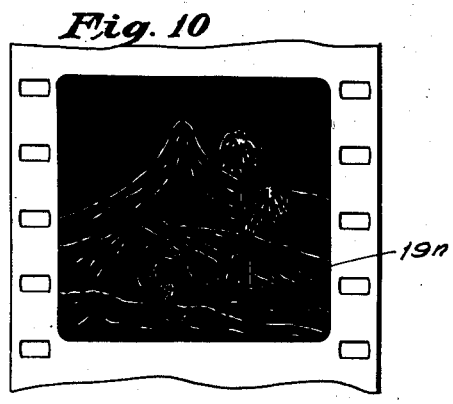
INVENTOR
MAX HANDSCHIEGL
By
ATTORNEY Patented Jan. 12, 1932

1,840,670

UNITED STATES PATENT OFFICE

MAX HANDSCHIEGL, OF LOS ANGELES, CALIFORNIA, ASSIGNOR TO BESSIE HANDSCHIEGL, OF LOS ANGELES, CALIFORNIA

TRICK METHOD OF PRODUCING COMPOSITE NEGATIVES

Application filed October 11, 1926. Serial No. 140,818.

As may be inferred from the above title, it is an object of this invention to provide a method for producing motion picture films by photographing one scene or action at a favorable time or place, photographing another scene or place, to produce a plurality of original negatives, and to utilize these original negatives in the production of a so-called "dup" or plural-source or "pedigreed" negative,—combining, without interference, the effects obtained by the mentioned separate exposures of original negative films.

It is an object of my present invention to accomplish the results referred to in such manner that the plural-source negative finally obtained need be exposed only once, and in such manner that no silhouette, mat, or the like, need be used during the mentioned single exposure thereof.

It is an object of my present invention to provide a method of the general character referred to in which the mentioned final or plural-source negative is obtained without any deferred printing in of any features whatever,—a plurality of complemental positives being used in the single light-impressing of the same, and the process being so executed as to facilitate tests, to make sure that light intensities are comparable.

It is a further object of my invention to provide a method of the general character referred to which obviates all need for the use of a non-actinic background in making the exposures of original negatives,—one of a plurality of original negatives (which may be taken with a white or light background yielding shadows) being used in the production of a hard positive,—to serve as a mat in the preparation of a counterpart or complemental positive from a second and different original negative, translucent or clear spots being thus provided in the last-mentioned positive, opposite the images constituting said mat.

It is a further object of my invention to provide a method of the general character referred to which obviates the use of color screens and nevertheless enables me to obtain, in my final plural-source negative, various shadows derived from either or both or all of the scenes or actions photographed; and it is a merit of my novel process or method herein described that it enables me, by the suitable printing of separate positives (as, a positive showing an action, and a positive showing a background, the latter being presumably a clear-spot positive prepared in the general manner described) to make both a background and an action as sharp as may be desired, or to make either or both as "fuzzy" or "diffuse" in outline as may be desired.

Other objects of my invention may be best appreciated from an illustrative embodiment thereof, taken in connection with the appended claims and the accompanying drawings, in which Fig. 1 is a diagrammatic representation of an initial step consisting in the photographing, in any usual or preferred manner, of a first scene or action, to produce one of a plurality of original negatives,—this negative being hereinafter arbitrarily referred to as the primary negative.

Fig. 2 is a diagrammatic representation of a second step consisting in the production of a positive, which may be an entirely normal positive, hereinafter referred to as the primary positive, from said negative, by any usual or preferred printing method.

Fig. 3 is intended to represent a primary positive produced in the general manner described.

Fig. 4 is a view, entirely similar to Fig. 2, in which the same primary negative is shown as employed in the production of a second and "hard" print to serve as a silhouette or mat positive.

Fig. 5 is a view corresponding to Fig. 3, but emphasizing the mat effect produced by "hard" printing, or equivalent technique.

Fig. 6 is a diagrammatic view corresponding to Fig 1, but intended to illustrate the "shooting" of a second scene or action (as, a background scene) for the production of a second original negative, herein referred to as a second or subsidiary negative.

Fig. 7 is a view, corresponding in general character to Figs. 2 and 4, but indicating the concurrent use of a subsidiary negative film, such as that illustrated in Fig. 6 and a mat positive, such as that illustrated in Fig. 5, in the production of an additional positive,—hereinafter referred to as a subsidiary or clear-spot positive, for the reason that areas thereof corresponding to images upon the silhouette or mat positive are left unprinted and translucent, as a result of the interposition of said mat positive.

Fig. 8 is a view comparable with Figs. 3 and 5, but intended to represent a clear-spot or subsidiary positive, such as might result from the step illustrated in Fig. 7.

Fig. 9 is a view comparable to Fig. 7, but intended to illustrate a final step in which light is transmitted through a primary positive, such as that illustrated in Fig. 3, and a clear-spot or subsidiary positive, such as that illustrated in Fig. 8, for the production of a desired plural-source of "pedigreed" or "dup" negative Fig. 10 is intended to represent a plural-source negative, as finally obtained in the general manner described Referring to the details of that specific embodiment of my invention chosen for purposes of illustration, a sensitized film 11 being exposed in any suitable camera, for the taking of a scene or action (represented by the nymph 12) the resultant negative 11n may be so disposed relatively to a light source 13 as to impress a print film 14, in a normal manner, to produce a primary positive 14p; and the same or a similar light source 13 may be used in connection with the same primary negative in the impressing of a second print film 15, the light being in this case of such an intensity or duration as to produce a comparatively "hard" silhouette mat positive 15p. Instead of relying entirely upon "hard" printing by special illumination, I may obviously resort, at this point, to any known or preferred method of intensification.

Either before or after the described operations, a second original negative film 16 may be exposed to a separate scene or action 17 (in which the intensity and direction of shadows may advantageously be somewhat similar to those produced by the nymph 12, or the like, in the "shooting" of the negative film 11) and the resultant subsidiary negative 16n may thereafter be used, in conjunction with the mat positive 15p, and any suitable source of light 13, in the impressing of an additional print film 18 for the production of a so-called clear-spot or subsidiary positive 18p,—the positives 14p and 18p being thus complemental.

A clear-spot positive 18p, whether obtained in the manner described or in an analogous manner, (as, by interposing 15p while "shooting" 18p) and a primary positive 14p may then be conjointly used, in connection with any suitable source or sources of light 13, in the light-impressing of an additional negative film 19,—the development and fixation of the latter resulting in the desired plural-source or "pedigreed" or "dup" negative 19n.

In the foregoing outline, I make no mention of development or fixation steps, these being of any usual or preferred character appropriate to the described method, and comparatively immaterial thereto.

Although the general equivalence of optical methods and contact methods of printing may be too obvious for comment, it is suggested that the former may be especially suitable to use in a correction of registry, or in case some relative enlargement or diminution of the scale, or some change in diffusion or sharpness of one or another of the scenes or actions is desired,—contact methods being otherwise advantageous, on account of their simplicity of management; but it will be understood that the principles of my invention are applicable in the production of "pedigreed" negatives based upon more than two original negatives,—as, by using a dual-source negative of the general character illustrated at 19n in conjunction with a mat positive obtained from a third original negative, in the production of a three-source negative, by a repetition of steps such as are illustrated in Figs. 7-10; and any plural-source negative prepared in the general manner described, under conditions favorable to a quick and reliable equalization of light effects and to any desired sharpness or fuzziness of outlines in any or all of the sets of images impressed upon the final negative, may obviously be utilized in any usual or preferred manner, in the production of corresponding positives for use in actual projection.

Among the obvious merits of the above process are the facts that it permits the use of an actinic or other background, that it obviates the use of silhouette mats during the exposure of the final negative film, that it involves no deferred printing in of additional images, and that it necessitates but a single exposure of said film,—under conditions which eliminate guessing, avoid waste, and expedite production.

Although I have herein described but a single complete embodiment suggesting modification of my invention, it should be understood not only that various features thereof might be independently employed, but also that numerous additional modifications might be devised by those skilled in the art to which this case relates, without involving the slightest departure from the spirit and scope of my invention, as the same is indicated above and in the following claims.

I claim as my invention:

1. In the production of plural-source motion picture negatives, a method which comprises: photographically preparing a normal action positive and a corresponding silhouette mat positive from a previously prepared negative carrying an image of an action component before a plain opaque background; interposing the mat positive in the photographic production of a subsidiary positive, to leave translucent areas therein, corresponding to images of said action; and printing the desired negative by light transmitted through said subsidiary positive and said normal positive.

2. A process for producing composite motion picture negatives which includes: photographing an action component before a plain background upon a sensitized film; developing said film to produce a negative of said action component; printing said negative to form a mat and an action component positive; photographing a background component upon a second sensitized film; developing the last mentioned film to produce a background negative; printing said background negative and said mat onto a third sensitized film to form a clear spot background positive; and printing said action component positive and said clear spot background positive onto a sensitized film to form a final composite negative.

3. A process for producing composite motion picture negatives which includes: photographing an action component before a plain background upon a sensitized film; developing said film to produce a negative of said action component; printing said negative to form a mat and an action component positive; photographing a background component upon a second sensitized film; and combining the image of said action component with the image of said background to produce a final composite negative, the combination of said images including photographically super-imposing said mat on said last mentioned film to produce a background clear spot positive and printing said action component positive in combination with said background clear spot positive.

In testimony whereof, I have hereunto set my hand at Los Angeles, California, this 18th day of September, 1926.

MAX HANDSCHIEGL.